Aug. 24, 1954
H. L. SNYDER
2,687,033
BLOCKS SIMULATING LOG STRUCTURE
Filed Oct. 19, 1948
2 Sheets—Sheet 1
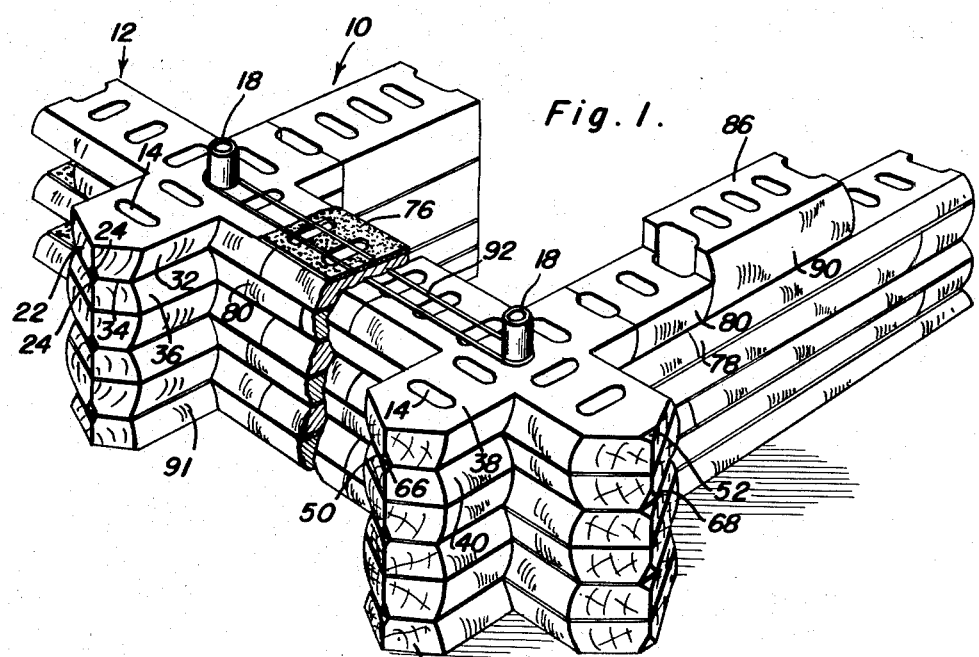
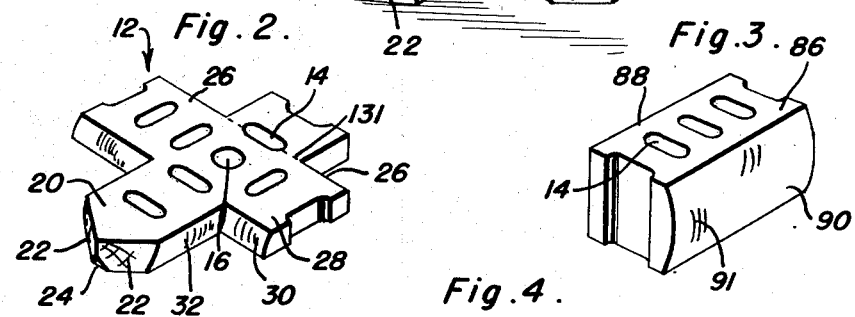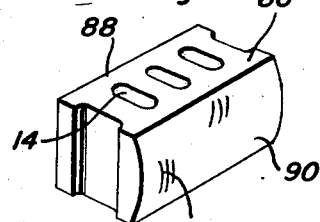
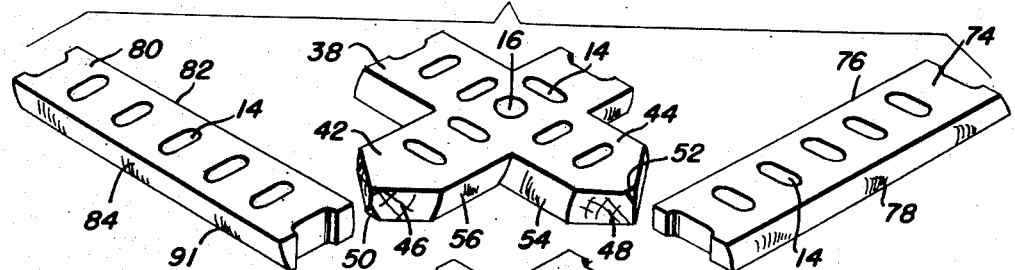
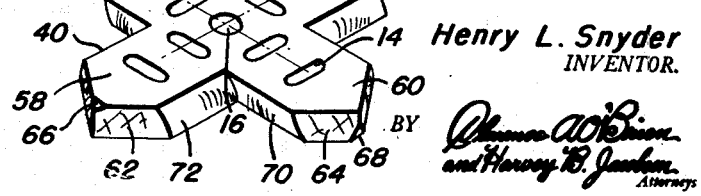
Henry L. Snyder
INVENTOR.
BY
*Attorneys*

Aug. 24, 1954     H. L. SNYDER     2,687,033
BLOCKS SIMULATING LOG STRUCTURE
Filed Oct. 19, 1948     2 Sheets-Sheet 2
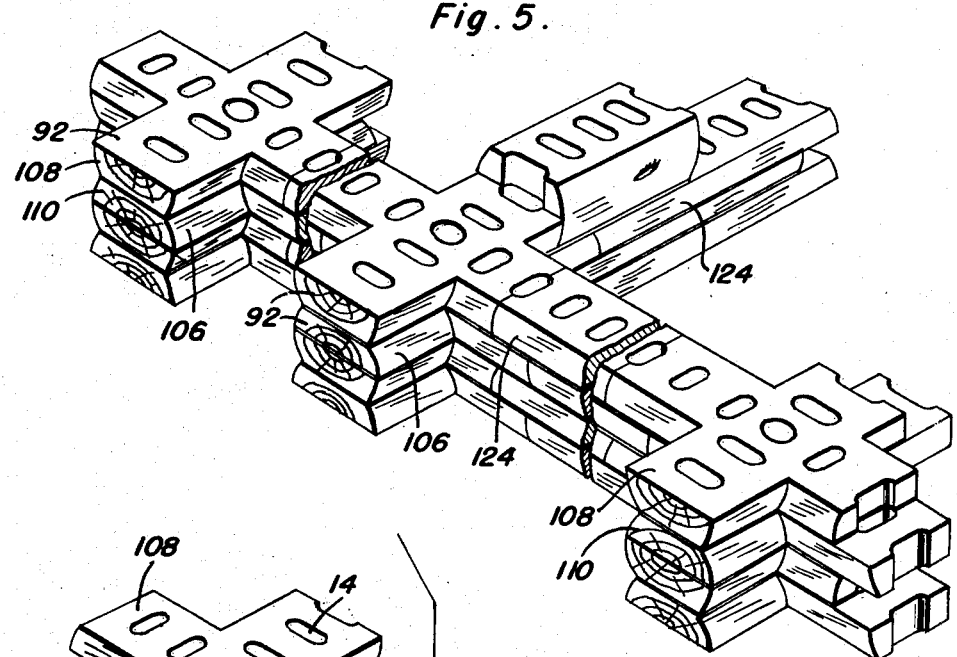
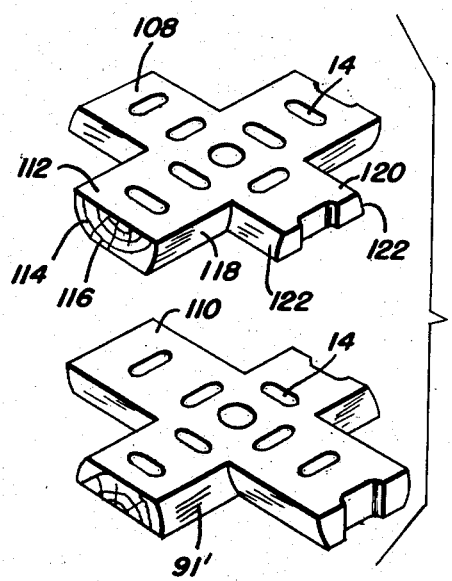
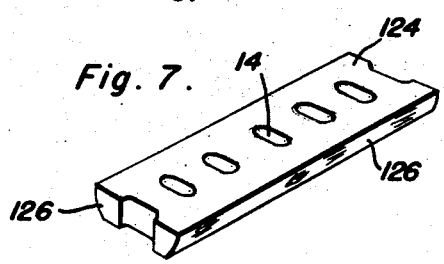
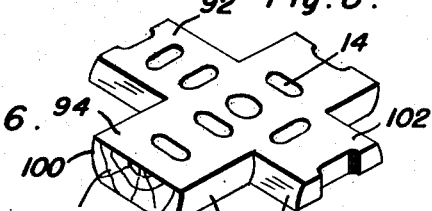
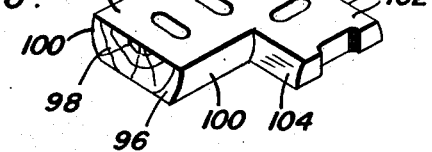
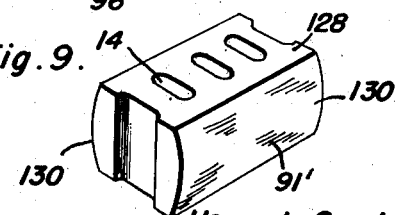
Henry L. Snyder
INVENTOR.

Patented Aug. 24, 1954

2,687,033

UNITED STATES PATENT OFFICE 2,687,033

BLOCKS SIMULATING LOG STRUCTURE

Henry L. Snyder, Bowmanstown, Pa.

Application October 19, 1948, Serial No. 55,398

8 Claims. (Cl. 72—39)

This invention relates to building blocks and has for its primary object the provision of blocks designed in such a manner that when joined together in proper order a log cabin structure is simulated.

Yet another object of this invention is to provide a masonry construction for simulating a log cabin in which the building blocks are made of concrete or other plastic material having the property of being poured, tamped, vibrated, or otherwise forced into a mold for shaping purposes.

Yet another object of this invention is to provide a masonry construction simulating a log cabin having substantially cruciform corner pieces which are formed with notches and arcuated outer surfaces in such a manner as to give a true effect of a log cabin corner construction.

Yet another object of this invention is to provide a masonry construction of the character described having arms which extend beyond the outer wall and peculiar to log structures as a solid portion of the wall structure in every laying course.

Another object of this invention is to provide on the arcuated exposed surfaces of building blocks, groups of lines in staggered formation, either parallel or at right angles to wall course and not approaching the edges of said blocks; said groups of lines indicating vertical or horizontal outer bark grains. The advantage of this feature is to facilitate the joining of aforementioned blocks in that no matching of surface lines is necessary.

These, together with various ancillary objects and features of the invention which will later become apparent as the following description proceeds, are attained by the device, a preferred embodiment of which has been illustrated, by way of example only, in the accompanying drawings, wherein:

Figure 1 is a perspective view of a portion of the masonry construction of the instant invention, partially assembled, some parts being broken away;

Figure 2 is a perspective view of one of the layers making up a partition corner piece;

Figure 3 is a perspective view of a filler block;

Figure 4 is a group perspective view of a modified form of the invention illustrating two complementary layers employed in forming the corner piece and two joining blocks, said joining blocks being similar in design and further illustrating the manner in which the blocks are applied to a lay course of intersecting walls;

Figure 5 is a perspective view of another modification of a portion of the masonry construction;

Figure 6 is a group perspective view of the two layers of blocks employed in forming the corner piece shown in Figure 5;

Figure 7 is a perspective view of a joining block;

Figure 8 is a perspective view of one of the layers making up a partition corner piece illustrating both interior and exterior wall surfaces arcuated; and Figure 9 is a perspective view of a filler block used in the masonry construction shown in Figure 5.

Specific reference will now be made to the drawings. In the several views, in the accompanying drawings and in the following specification, similar reference characters indicate corresponding elements throughout.

Indicated generally at 10 is the masonry construction of the instant invention which, as seen from the drawings, consists essentially of a plurality of superimposed layers of pre-formed concrete or plastic blocks, the construction of which follows hereinafter.

As shown in Figure 2, a substantially cruciform flat member 12 is provided having a plurality of elongated vertical slots 14 extending therethrough and a substantially circular aperture 16 at the corner thereof for receivably retaining a dowel pin 18 therein. One of the arms 20 of the cruciform member 12 is tapered, as at 22, and is further provided with a bevel 24 at the bottom edge thereof, beginning at the incipiency of the taper. The inner surfaces 26 are planar in this modification, while the outer surfaces of the cross member 28 are downwardly and outwardly curved as at 30. The outer surfaces of the tapered arm 20 are downwardly and inwardly curved, as at 32. It is to be understood at this point that the curvatures 30 and 32 are oppositely inclined and may be reversed depending upon the design and assemblage of the partition corner pieces.

As will be seen more clearly in Figure 1, the partition corner piece 12 is, in effect, a top layer superimposed upon and joined to by means of mortar 34, a complementary bottom layer 36 which is identical in construction to that of the upper layer, this block being its own complement—that is, it merely has to be turned upside down to match itself and complete the shape of the log portion and at the same time effect masonry. The masonry is effected by reason of the one branch being shorter than the other.

Simultaneously, the bevels 24 oppose each other to form a notch therebetween, simulating the effect obtained when logs are cut and superimposed upon each other. As shown in Figure 1, this construction is continued throughout the entire length of the masonry construction.

As will be seen more clearly from Figure 4, a corner piece is provided which consists of an upper cruciform member 38 and a lower cruciform member 40 including arms forming a portion of each intersecting wall course. The upper and lower cruciform members include elongated vertical slots 14 extending therethrough and substantially circular apertures 16 at the corners thereof for receivably retaining the dowel pin 18 mentioned hereinabove. The two adjacent arms 42 and 44 of the upper member 38 are tapered, as at 46 and 48, with a bevel 50 at the bottom of the taper 46 and a bevel 52 at the top of the taper 48. The arm 44 and its extension include outer surfaces 54 which are downwardly and outwardly curved, while the outer surface 56 of the arm 42 and its extension are downwardly and inwardly curved.

The bottom member 40 is complementary to the top member 38 but reverse in design, as shown more clearly in Figure 4. The lower layer 40, therefore, includes adjacent arms 58 and 60 which are tapered at 62 and 64, the taper 62 being provided with a bevel 66 at its top portion, while the taper 64 is provided with a bevel 68 at its bottom portion. The outer surfaces 70 of the arm 60 and its extension are downwardly and inwardly curved, while the outer surfaces 72 of the arm 58 and its extension are downwardly and outwardly curved. When the two layers 38 and 40 are superimposed on each other and joined by means of mortar, a construction shown in Figure 1 is obtained.

The corner pieces 40 and 38 are joined by longitudinally extending joining blocks 74 having an inner planar surface 76, elongated vertical slots 14, and an outwardly and downwardly curved outer surface 78. This joining block is superimposed upon a complementary joining block 80 which is identical in design to that of joining block 74, being applied invertedly in the wall course as in the manner shown in Figures 1 and 4, and has a planar inner surface 82 and a downwardly and inwardly curved outer surface 84. It will be seen that this bottom joining block 80 joins the complementary corner piece 38 with the lower corner member 40.

To assist in the more rapid laying or building up of the masonry construction so that less horizontal mortar joints would be required, filler blocks 86 are provided which, as shown more clearly in Figure 3, are twice the thickness of the joining blocks 74 and 80. These filler blocks include an inner planar surface 88, vertical elongated apertures 14, and an outer convexed surface 90, and groups of lines 91 impressed on convex surfaces on this and all other blocks described herein substantially as shown in Figure 3. If desired, the dowel pins 18 may be joined by a wire 92 for reinforcement purposes.

The drawings 5 to 9 illustrate a further modification of the masonry construction of the instant invention which, in the main, is similar to that shown in Figures 1 to 4. The difference resides mainly in the fact that the corner pieces are not tapered. Also, both the inner and outer surfaces of the various units employed in the masonry construction are arcuated.

As seen more clearly in Figure 8, one of the partition corner pieces includes an upper layer or member 92 which is substantially cruciform in shape, one arm 94 of which actually forms the corner and is planar at the end thereof, as at 96, upon which is impressed a web design 98 simulating a sheared log. The outer surfaces of the arm 94 and its extension are downwardly and inwardly curved, as at 100, while the outer surfaces of the cross member 102 are downwardly and outwardly curved, as at 104. This partition corner piece 92 is superimposed upon a similar partition corner piece 106 which is identical in design but applied invertedly in the wall course, as shown in Figure 5. This construction is continued throughout the entire length of the building.

A corner construction is provided which consists of an upper cruciform layer or block 108 and a lower cruciform block 110, the upper layer 108 superimposed upon the lower layer 110 and joined thereto by means of mortar. As will be seen more clearly in Figure 6, the upper layer is provided with a corner arm 112 having a planar outer surface 114 which is further impressed with a web design 116 similar to that represented by the numeral 98. The outer surfaces of the arm 112 and its extension are downwardly and inwardly curved, as at 118, while the outer surfaces of the cross arm 120 are downwardly and outwardly curved, as at 122.

The lower layer 110 is exactly the same in construction as that of the upper layer 108 but exactly reverse in design and curvatures. The corner pieces 92 and 106 are joined with the corner pieces 108 and 110 by means of joining blocks 124, one such clock being shown for illustrative purposes in Figure 7. The blocks are provided with longitudinally spaced vertical elongated slots 14, while both of the outer surfaces are curved to conform with the layers of the two corner blocks that must be joined. The block shown in Figure 7 has outer surfaces 126 which are downwardly and inwardly inclined, it being understood that a similar block is superimposed upon the block 124 and has outer surfaces which are downwardly and outwardly curved.

As will be seen in Figure 9, spacer blocks 128 are provided equivalent in function to the spacer blocks 86 mentioned hereinabove consisting of vertical elongated apertures 14 and convex outer surfaces 130, and as distinctly shown on convex surface of filler block 128 and on the convex surfaces of all blocks hereindescribed, groups of lines 91' in staggered places on said curved surfaces, approximately parallel to wall course, and away from edges substantially as shown in Figure 9.

It might be well to note in connection with partition corner blocks as shown in Figures 2 and 8 that the portion which meets the inner partition wall can readily be cut at dotted line 131 or manufactured having this portion eliminated. The block thus made can be used to denote an inner partition whether or not said partition exists. The portion of the log arm extending out from the outer wall acts as a pilaster or wall stiffener generally employed in wall structures and familiar to the building trade.

Thus, it will be seen that a novel masonry construction is provided of units which are joined by mortar and arcuated in such a fashion as to completely simulate cut and joined logs normally employed in a log cabin construction. It should be noted in passing that while the corner pieces have been described as cruciform in shape, the angles formed between the cross arms could be varied above or below ninety degrees if desired.

It will be understood that by the term "wall course" is meant the line of direction of a wall and by the term "lay surface" is meant the horizontal flat surface upon which successive layers are placed in building up the wall.

In view of the foregoing description taken in conjunction with the accompanying drawings, it is believed that a clear understanding of the device will be quite apparent to those skilled in this art. A more detailed description is accordingly deemed unnecessary.

It is to be understood, however, that even though there is herein shown and described a preferred embodiment of the invention, the same is susceptible to certain changes fully comprehended by the spirit of the invention as herein described and within the scope of the appended claims.

Having described the invention, what is claimed as new is:

1. A masonry construction simulating a log structure comprising a pair of superimposed complementary blocks, each of said pair of blocks being substantially cruciform in shape, said blocks having intersecting arms, said arms defining intersecting walls, the upper of said pair of blocks having downwardly and outwardly curved, quarter round, exterior exposed surfaces and planar interior exposed surfaces on one arm defining one wall and downwardly and inwardly curved, quarter round, exterior exposed surfaces and planar interior exposed surfaces on the arm defining the intersecting wall, the lower of said pair of blocks having downwardly and inwardly curved, quarter round, exterior exposed surfaces and planar interior exposed surfaces on one arm forming part of the said one wall and downwardly and outwardly curved, quarter round, exterior exposed surfaces on the arm forming a part of the said intersecting wall.

2. A masonry construction simulating a log structure comprising a pair of superimposed complementary blocks, each of said pairs of blocks being substantially cruciform in shape, said blocks having intersecting arms, said arms defining intersecting walls, the upper of said pair of blocks having downwardly and outwardly curved, quarter round, exterior exposed surfaces and planar interior exposed surfaces on one arm defining one wall and downwardly and inwardly curved, quarter round, exterior exposed surfaces and planar interior exposed surfaces on the arm defining the intersecting wall, the lower of said pair of blocks having downwardly and inwardly curved, quarter round, exterior exposed surfaces and planar interior exposed surfaces on one arm forming part of the said one wall and downwardly and outwardly curved, quarter round, exterior exposed surfaces on the arm forming a part of the said intersecting wall, an arm terminating at one end thereof in substantially equal angular, vertical planar tapers, said arm being provided with a bevel beginning at the inception of the taper and terminating at a horizontal surface of said block having a lesser area than another horizontal surface of said block, and impressed segmental curved lines on said tapers.

3. A masonry construction simulating log construction having true notched log corner construction, comprising a plurality of a pair of conformably superimposed building blocks, each of said pair of blocks being cruciform in general shape, the cross-members of each block defining a portion of two intersecting walls, the sides of said cross-members defining interior and exterior exposed side surfaces of the intersecting walls they define, the exterior sides of said cross-members are curved and the interior sides are planar; the upper block of said pair of blocks having downwardly and outwardly curved exterior side surfaces and planar interior side surface on the one cross-member defining a portion of the one wall and downwardly and inwardly curved exterior side surfaces and planar interior side surface on the second cross-member defining a portion of the intersecting wall; the lower block of said pair of blocks having downwardly and inwardly curved exterior side surfaces and planar interior side surface on the one cross-member defining a portion of the said one wall and downwardly and outwardly curved exterior side surfaces and planar interior side surface on the second cross-member defining a portion of said intersecting wall; the one end of each cross-member of each of the pair of blocks defining the abutting portion of the wall continued, the other end of each cross-member is the terminating portion of the wall it defines, the top and bottom surfaces of each block are substantially planar and are the lay surfaces for superimposing one block upon the other.

4. The combination of claim 3 wherein the ends of the cross-members defining the terminating ends of intersecting walls are substantially planar, vertical, and square in relation to the longitudinal direction of the wall each end defines and arcs parallel to each other and radial lines impressed on said ends substantially away from the edges where the end surface meets the lay surfaces.

5. The combination of claim 3 wherein the ends of the cross-members defining the terminating ends of intersecting walls are equal angular, equal distant, vertical, and planar tapers, said tapers are equal angular and equal distant in relation to the center of the simulated log, and a bevel in combination with said tapers beginning at the inception of the tapers and terminating at the lay surface having the lesser cross dimension, and impressed lines on said planar tapers, said lines are parallel arcs and radial lines impressed substantially away from the joining edges.

6. In combination with claim 3 and a third type block being straight in general shape and having the same cross-section as the abutting end of either cross-member of either of the pair of blocks defining a portion of the wall continued, and groups of lines impressed on the curved side thereof substantially away from the joining edges.

7. A masonry construction simulating log construction having true notched log corner construction, comprising a plurality of a pair of conformably superimposed building blocks, each of said pair of blocks being cruciform in general shape having cross-members defining a portion of two intersecting walls, the sides of said cross-members defining interior and exterior exposed side surfaces of the intersecting walls they define, the exterior and the interior sides of said cross-members are curved, the upper block of said pair of blocks has downwardly and outwardly curved exterior and interior side surfaces on the one cross-member defining a portion of the one wall and downwardly and inwardly curved exterior and interior sides surfaces on the second cross-member defining a portion of the intersecting wall; the lower block of said pair of blocks having downwardly and inwardly curved exterior and interior side surfaces on the one cross-member defining a portion of the said one wall and downwardly and outwardly curved exterior and interior side surfaces on the second cross-member defining a portion of said intersecting wall, the one end of each cross-member of each of the pair of blocks defining the abutting portion of the wall continued, the other end of each cross-member is the terminating portion of the wall it defines, the top and bottom surfaces of each block are substantially planar and are the lay surfaces for superimposing one block upon the other.

8. In combination with claim 7 and a third type block being straight in general shape and having the same cross-section as the abutting end of either cross-member of either of the pair of blocks defining a portion of the wall continued, and groups of lines impressed on the curved sides thereof substantially away from the joining edges.

References Cited in the file of this patent

UNITED STATES PATENTS

| Number | Name | Date |
|---|---|---|
| D. 82,106 | Nelson et al. | Sept. 23, 1930 |
| D. 119,606 | Bebar | Mar. 26, 1940 |
| 1,287,771 | Schmitt | Dec. 17, 1918 |
| 1,971,994 | Smith | Aug. 28, 1934 |
| 2,130,231 | Forciea | Sept. 13, 1938 |
| 2,151,244 | Stites | Mar. 21, 1939 |

FOREIGN PATENTS

| Number | Country | Date |
|---|---|---|
| 67,941 | Norway | of 1944 |